United States Patent
Wang

(10) Patent No.: US 9,237,515 B2
(45) Date of Patent: *Jan. 12, 2016

(54) SUCCESSIVE DETECTION AND CANCELLATION FOR CELL PILOT DETECTION

(75) Inventor: Michael M. Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1082 days.

This patent is subject to a terminal disclaimer.

(21) Appl. No.: 12/533,495

(22) Filed: Jul. 31, 2009

(65) Prior Publication Data

US 2010/0029213 A1    Feb. 4, 2010

Related U.S. Application Data

(60) Provisional application No. 61/085,754, filed on Aug. 1, 2008.

(51) Int. Cl.
*H04W 24/00* (2009.01)
*H04W 48/20* (2009.01)
(Continued)

(52) U.S. Cl.
CPC ........... *H04W 48/20* (2013.01); *H04B 1/71072* (2013.01); *H04B 2201/70701* (2013.01); *H04B 2201/70702* (2013.01); *H04L 25/0228* (2013.01); *H04L 25/03006* (2013.01)

(58) Field of Classification Search
CPC ............. H04W 48/20; H04B 1/71072; H04B 2201/70701; H04B 2201/70702
USPC .............. 455/429, 434, 443, 447, 455, 456.1, 455/513, 515, 516, 517, 63.1
See application file for complete search history.

(56) References Cited

U.S. PATENT DOCUMENTS 4,718,066 A    1/1988    Rogard
4,885,744 A    12/1989    Lespagnol et al.
(Continued)

FOREIGN PATENT DOCUMENTS

CN    1207835 A    2/1999
CN    1250269 A    4/2000
(Continued)

OTHER PUBLICATIONS

3GPP Draft; 25.814-V1.5.0, 3rd Generation Partnership Project (3GPP), Mobile Competence Centre ; 650, Route Des Lucioles ; F-06921 Sophia-Antipolis Cedex ; France, vol. RAN WG1, No. Shanghai, China; May 26, 2006, XP050102001, pp. 1-125.
(Continued)

*Primary Examiner* — Ping Hsieh
(74) *Attorney, Agent, or Firm* — Nerrie M. Zohn

(57) ABSTRACT

Techniques for performing cell detection with successive detection and cancellation (SDC) are described. For SDC, pilots from stronger cells may be canceled from a received signal at a user equipment (UE) so that weaker cells may be detected as a result of reduced interference from the stronger cells. In one design, a UE processes a received signal to detect for a cell and determines whether the detected cell is sufficiently strong. If the cell is sufficiently strong, then the UE cancels the interference due to the detected cell from the received signal and further processes an interference-canceled signal to detect for another cell. The UE may detect for cells in a set of cells in a sequential order, from the strongest cell to the weakest cell. The UE may terminate detection when a cell not sufficiently strong is detected or when all cells in the set are detected.

28 Claims, 6 Drawing Sheets

(51) Int. Cl.
*H04B 1/7107* (2011.01)
*H04L 25/02* (2006.01)
*H04L 25/03* (2006.01)

(56) References Cited

U.S. PATENT DOCUMENTS

| | | |
|---|---|---|
| 5,172,118 A | 12/1992 | Peregrim et al. |
| 5,173,702 A | 12/1992 | Young et al. |
| 5,173,703 A | 12/1992 | Mangiapane et al. |
| 5,185,608 A | 2/1993 | Pozgay |
| 5,267,249 A | 11/1993 | Dong |
| 5,710,784 A | 1/1998 | Kindred et al. |
| 5,721,745 A | 2/1998 | Hladik et al. |
| 5,751,725 A | 5/1998 | Chen |
| 5,774,450 A | 6/1998 | Harada et al. |
| 5,774,496 A | 6/1998 | Butler et al. |
| 5,887,035 A | 3/1999 | Molnar |
| 5,960,361 A | 9/1999 | Chen |
| 5,983,383 A | 11/1999 | Wolf |
| 6,108,373 A | 8/2000 | Fargues et al. |
| 6,169,759 B1 | 1/2001 | Kanterakis et al. |
| 6,208,699 B1 | 3/2001 | Chen et al. |
| 6,259,730 B1 | 7/2001 | Solondz |
| 6,282,233 B1 | 8/2001 | Yoshida |
| 6,285,682 B1 | 9/2001 | Proctor et al. |
| 6,396,867 B1 | 5/2002 | Tiedemann, Jr. et al. |
| 6,480,558 B1* | 11/2002 | Ottosson et al. ............... 375/350 |
| 6,496,706 B1 | 12/2002 | Jou et al. |
| 6,532,254 B1 | 3/2003 | Jokinen |
| 6,545,989 B1 | 4/2003 | Butler |
| 6,553,224 B1 | 4/2003 | Kim |
| 6,587,522 B1 | 7/2003 | Wheeler et al. |
| 6,590,881 B1 | 7/2003 | Wallace et al. |
| 6,615,030 B1 | 9/2003 | Saito et al. |
| 6,628,707 B2 | 9/2003 | Rafie et al. |
| 6,633,601 B1 | 10/2003 | Yang |
| 6,741,661 B2 | 5/2004 | Wheatley, III et al. |
| 6,744,814 B1 | 6/2004 | Blanksby et al. |
| 6,747,963 B1 | 6/2004 | Park et al. |
| 6,765,531 B2 | 7/2004 | Anderson |
| 6,765,894 B1 | 7/2004 | Hayashi |
| 6,771,689 B2 | 8/2004 | Solondz |
| 6,771,934 B2 | 8/2004 | Demers et al. |
| 6,834,197 B2 | 12/2004 | Nakahara et al. |
| 6,907,092 B1 | 6/2005 | Yakhnich et al. |
| 6,917,607 B1 | 7/2005 | Yeom et al. |
| 6,931,030 B1 | 8/2005 | Dogan |
| 6,934,264 B2 | 8/2005 | Jou |
| 6,956,893 B2 | 10/2005 | Frank et al. |
| 6,959,010 B1 | 10/2005 | Bahrenburg et al. |
| 6,975,604 B1 | 12/2005 | Ishida et al. |
| 6,977,888 B1 | 12/2005 | Frenger et al. |
| 6,983,166 B2 | 1/2006 | Shiu et al. |
| 6,985,516 B1 | 1/2006 | Easton et al. |
| 7,006,439 B2 | 2/2006 | Thron et al. |
| 7,006,795 B2 | 2/2006 | Foschini et al. |
| 7,013,147 B1 | 3/2006 | Kuwahara et al. |
| 7,023,880 B2 | 4/2006 | El-Maleh et al. |
| 7,031,742 B2 | 4/2006 | Chen et al. |
| 7,042,869 B1 | 5/2006 | Bender |
| 7,051,268 B1 | 5/2006 | Sindhushayana et al. |
| 7,107,031 B2 | 9/2006 | Kristensson et al. |
| 7,116,735 B2 | 10/2006 | Yamada et al. |
| 7,123,590 B2 | 10/2006 | Mir et al. |
| 7,130,365 B2 | 10/2006 | Li |
| 7,167,502 B1 | 1/2007 | Tsaur |
| 7,187,736 B2 | 3/2007 | Buckley et al. |
| 7,200,172 B2 | 4/2007 | Pukkila et al. |
| 7,224,962 B1 | 5/2007 | Kite |
| 7,295,636 B2 | 11/2007 | Onggosanusi et al. |
| 7,298,806 B1 | 11/2007 | Varma et al. |
| 7,302,009 B2 | 11/2007 | Walton et al. |
| 7,308,056 B2 | 12/2007 | Pukkila et al. |
| 7,313,189 B2 | 12/2007 | Yoshida et al. |
| 7,315,527 B2 | 1/2008 | Wei et al. |
| 7,349,379 B2 | 3/2008 | Schmidl et al. |
| 7,406,065 B2 | 7/2008 | Willenegger et al. |
| 7,466,666 B2 | 12/2008 | Yoon et al. |
| 7,613,144 B2 | 11/2009 | Malladi et al. |
| 7,620,662 B2 | 11/2009 | Kassai et al. |
| 7,630,321 B2 | 12/2009 | Jain et al. |
| 7,649,839 B2 | 1/2010 | Dendy |
| 7,650,116 B2* | 1/2010 | Haartsen ...................... 455/63.1 |
| 7,693,210 B2 | 4/2010 | Margetts et al. |
| 7,706,430 B2 | 4/2010 | Guo et al. |
| 7,724,701 B2 | 5/2010 | Lundby et al. |
| 7,764,726 B2 | 7/2010 | Simic et al. |
| 7,881,711 B2 | 2/2011 | Lundby |
| 8,077,637 B2 | 12/2011 | Fujimoto |
| 8,160,002 B2 | 4/2012 | Rajkotia et al. |
| 8,201,039 B2 | 6/2012 | Tiedemann, Jr. et al. |
| 8,259,848 B2 | 9/2012 | Malladi |
| 8,332,710 B2 | 12/2012 | Tsai et al. |
| 8,369,214 B2 | 2/2013 | Kim et al. |
| 8,396,440 B2 | 3/2013 | Canpolat et al. |
| 8,411,618 B2 | 4/2013 | Kim et al. |
| 8,422,955 B2 | 4/2013 | Smee et al. |
| 8,428,109 B2 | 4/2013 | Yang et al. |
| 8,442,441 B2 | 5/2013 | Pfister et al. |
| 8,489,128 B2 | 7/2013 | Lundby |
| 8,588,119 B2 | 11/2013 | Panta et al. |
| 8,594,252 B2 | 11/2013 | Black et al. |
| 8,611,305 B2 | 12/2013 | Black et al. |
| 8,630,602 B2 | 1/2014 | Attar et al. |
| 8,660,145 B2 | 2/2014 | Carmon et al. |
| 2001/0018650 A1 | 8/2001 | DeJaco |
| 2001/0021229 A1 | 9/2001 | Belaiche |
| 2002/0006138 A1 | 1/2002 | Odenwalder |
| 2002/0046379 A1 | 4/2002 | Miki et al. |
| 2002/0071407 A1 | 6/2002 | Koo et al. |
| 2002/0093937 A1 | 7/2002 | Kim et al. |
| 2002/0131381 A1 | 9/2002 | Kim et al. |
| 2002/0131532 A1 | 9/2002 | Chi et al. |
| 2002/0132625 A1* | 9/2002 | Ogino et al. ................... 455/456 |
| 2002/0181557 A1 | 12/2002 | Fujii |
| 2003/0004784 A1 | 1/2003 | Li et al. |
| 2003/0041206 A1 | 2/2003 | Dickie |
| 2003/0063596 A1 | 4/2003 | Arslan et al. |
| 2003/0078067 A1 | 4/2003 | Kim et al. |
| 2003/0103470 A1 | 6/2003 | Yafuso |
| 2003/0112370 A1 | 6/2003 | Long et al. |
| 2003/0119451 A1 | 6/2003 | Jang et al. |
| 2003/0125037 A1 | 7/2003 | Bae et al. |
| 2003/0134656 A1 | 7/2003 | Chang et al. |
| 2003/0147476 A1 | 8/2003 | Ma et al. |
| 2003/0199290 A1 | 10/2003 | Viertola |
| 2003/0212816 A1 | 11/2003 | Bender et al. |
| 2003/0223396 A1 | 12/2003 | Tsai et al. |
| 2004/0001563 A1 | 1/2004 | Scarpa |
| 2004/0005897 A1 | 1/2004 | Tomoe et al. |
| 2004/0017311 A1 | 1/2004 | Thomas et al. |
| 2004/0043746 A1 | 3/2004 | Hiramatsu |
| 2004/0062302 A1 | 4/2004 | Fujii et al. |
| 2004/0081124 A1 | 4/2004 | Black et al. |
| 2004/0081248 A1 | 4/2004 | Parolari |
| 2004/0082356 A1 | 4/2004 | Walton et al. |
| 2004/0085917 A1 | 5/2004 | Fitton et al. |
| 2004/0085936 A1 | 5/2004 | Gopalakrishnan et al. |
| 2004/0116122 A1* | 6/2004 | Zeira et al. ...................... 455/445 |
| 2004/0131007 A1 | 7/2004 | Smee et al. |
| 2004/0141525 A1 | 7/2004 | Bhushan et al. |
| 2004/0157614 A1 | 8/2004 | Fujita et al. |
| 2004/0160933 A1 | 8/2004 | Odenwalder et al. |
| 2004/0168113 A1 | 8/2004 | Murata et al. |
| 2004/0185868 A1 | 9/2004 | Jain et al. |
| 2004/0198404 A1 | 10/2004 | Attar et al. |
| 2004/0203913 A1 | 10/2004 | Ogino et al. |
| 2004/0223507 A1 | 11/2004 | Kuchibhotla et al. |
| 2004/0223538 A1* | 11/2004 | Zeira ............................. 375/148 |
| 2004/0229615 A1 | 11/2004 | Agrawal |
| 2004/0240400 A1 | 12/2004 | Khan |
| 2004/0240416 A1 | 12/2004 | Derryberry et al. |
| 2005/0013263 A1 | 1/2005 | Kim et al. |
| 2005/0018614 A1 | 1/2005 | Kiran et al. |

(56) References Cited

U.S. PATENT DOCUMENTS

| | | |
|---|---|---|
| 2005/0037718 A1 | 2/2005 | Kim et al. |
| 2005/0037775 A1* | 2/2005 | Moeglein et al. ......... 455/456.1 |
| 2005/0053088 A1 | 3/2005 | Cheng et al. |
| 2005/0058154 A1 | 3/2005 | Lee et al. |
| 2005/0084045 A1 | 4/2005 | Stewart et al. |
| 2005/0111408 A1* | 5/2005 | Skillermark et al. ......... 370/331 |
| 2005/0147024 A1 | 7/2005 | Jung et al. |
| 2005/0153695 A1 | 7/2005 | Cho |
| 2005/0185364 A1 | 8/2005 | Bell et al. |
| 2005/0195889 A1* | 9/2005 | Grant et al. .................... 375/148 |
| 2005/0213505 A1 | 9/2005 | Iochi et al. |
| 2005/0220042 A1 | 10/2005 | Chang et al. |
| 2005/0232174 A1 | 10/2005 | Onggosanusi et al. |
| 2005/0249163 A1 | 11/2005 | Kim et al. |
| 2005/0265399 A1 | 12/2005 | El-Maleh et al. |
| 2005/0265465 A1 | 12/2005 | Hosur et al. |
| 2005/0277429 A1 | 12/2005 | Laroia et al. |
| 2006/0003792 A1 | 1/2006 | Gholmieh et al. |
| 2006/0050666 A1 | 3/2006 | Odenwalder |
| 2006/0109938 A1 | 5/2006 | Challa et al. |
| 2006/0126491 A1* | 6/2006 | Ro et al. ........................ 370/208 |
| 2006/0126765 A1 | 6/2006 | Shin et al. |
| 2006/0126844 A1 | 6/2006 | Mauro |
| 2006/0141935 A1 | 6/2006 | Hou et al. |
| 2006/0142038 A1 | 6/2006 | Ozarow et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209783 A1 | 9/2006 | Jain et al. |
| 2006/0209902 A1 | 9/2006 | Grilli et al. |
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0021148 A1 | 1/2007 | Mahini |
| 2007/0040704 A1 | 2/2007 | Smee et al. |
| 2007/0050189 A1 | 3/2007 | Cruz-Zeno et al. |
| 2007/0058709 A1 | 3/2007 | Chen et al. |
| 2007/0058746 A1 | 3/2007 | Gueguen |
| 2007/0063897 A1 | 3/2007 | Matsuda |
| 2007/0071145 A1 | 3/2007 | Perets |
| 2007/0076707 A1 | 4/2007 | Link et al. |
| 2007/0086513 A1 | 4/2007 | Fernandez-Corbaton et al. |
| 2007/0110095 A1 | 5/2007 | Attar et al. |
| 2007/0112564 A1 | 5/2007 | Jelinek |
| 2007/0121554 A1 | 5/2007 | Luo et al. |
| 2007/0121764 A1 | 5/2007 | Chen et al. |
| 2007/0127608 A1 | 6/2007 | Scheim et al. |
| 2007/0133423 A1 | 6/2007 | Okumura |
| 2007/0133475 A1 | 6/2007 | Peisa et al. |
| 2007/0150787 A1 | 6/2007 | Kim et al. |
| 2007/0150788 A1 | 6/2007 | Zhuyan |
| 2007/0183483 A1* | 8/2007 | Narayan et al. ............... 375/148 |
| 2007/0201548 A1 | 8/2007 | Badri-Hoeher et al. |
| 2007/0273698 A1 | 11/2007 | Du et al. |
| 2008/0019308 A1 | 1/2008 | Chuan-Lin et al. |
| 2008/0019467 A1 | 1/2008 | He |
| 2008/0031368 A1 | 2/2008 | Lindoff et al. |
| 2008/0057963 A1 | 3/2008 | Kayama et al. |
| 2008/0076432 A1 | 3/2008 | Senarath et al. |
| 2008/0080363 A1 | 4/2008 | Black et al. |
| 2008/0080406 A1 | 4/2008 | Peplinski et al. |
| 2008/0101440 A1 | 5/2008 | Lee |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2008/0305790 A1 | 12/2008 | Wakabayashi |
| 2009/0022098 A1 | 1/2009 | Novak et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0109907 A1 | 4/2009 | Tsai et al. |
| 2009/0207944 A1 | 8/2009 | Furman et al. |
| 2009/0213971 A1 | 8/2009 | Park et al. |
| 2009/0232052 A1 | 9/2009 | Black et al. |
| 2009/0303968 A1 | 12/2009 | Jou et al. |
| 2009/0303976 A1 | 12/2009 | Jou et al. |
| 2009/0304024 A1 | 12/2009 | Jou et al. |
| 2010/0027702 A1 | 2/2010 | Vijayan et al. |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0097955 A1 | 4/2010 | Jou |
| 2010/0172383 A1 | 7/2010 | Montalvo et al. |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0051864 A1 | 3/2011 | Chalia et al. |
| 2011/0264976 A1 | 10/2011 | Yang et al. |
| 2011/0305303 A1 | 12/2011 | Sikri et al. |
| 2012/0243515 A1 | 9/2012 | Xue et al. |
| 2012/0281675 A1 | 11/2012 | Liang et al. |
| 2014/0187248 A1 | 7/2014 | Black et al. |

FOREIGN PATENT DOCUMENTS

| | | |
|---|---|---|
| CN | 1278382 A | 12/2000 |
| CN | 1304589 A | 7/2001 |
| CN | 1311612 A | 9/2001 |
| CN | 1315095 A | 9/2001 |
| CN | 1394407 A | 1/2003 |
| CN | 1447549 A | 10/2003 |
| CN | 1497857 A | 5/2004 |
| CN | 1552133 A | 12/2004 |
| CN | 1736101 A | 2/2006 |
| CN | 1742457 A | 3/2006 |
| CN | 1758563 A | 4/2006 |
| CN | 1893406 A | 1/2007 |
| CN | 1906862 A | 1/2007 |
| CN | 1983913 A | 6/2007 |
| CN | 101189901 A | 5/2008 |
| CN | 101366305 A | 2/2009 |
| CN | 101465689 A | 6/2009 |
| CN | 101483499 A | 7/2009 |
| EP | 0396403 A1 | 11/1990 |
| EP | 0949766 A2 | 10/1999 |
| EP | 0969608 A2 | 1/2000 |
| EP | 1168703 A2 | 1/2002 |
| EP | 1199833 A2 | 4/2002 |
| EP | 1347611 A1 | 9/2003 |
| EP | 1398984 A1 | 3/2004 |
| EP | 1404047 A2 | 3/2004 |
| EP | 1411693 A2 | 4/2004 |
| EP | 1422900 A1 | 5/2004 |
| EP | 1478117 A2 | 11/2004 |
| EP | 1569399 A1 | 8/2005 |
| EP | 1643737 A1 | 4/2006 |
| EP | 1677433 A1 | 7/2006 |
| EP | 1681775 A2 | 7/2006 |
| EP | 1699194 A1 | 9/2006 |
| EP | 1699195 A1 | 9/2006 |
| EP | 1701565 A1 | 9/2006 |
| EP | 1703659 A2 | 9/2006 |
| EP | 1821497 A1 | 8/2007 |
| EP | 1928138 A2 | 6/2008 |
| GB | 2337417 | 11/1999 |
| JP | 62239735 A | 10/1987 |
| JP | 10500811 | 1/1998 |
| JP | H10327126 A | 12/1998 |
| JP | 2000059290 A | 2/2000 |
| JP | 2000261397 A | 9/2000 |
| JP | 2001036964 A | 2/2001 |
| JP | 2001078252 | 3/2001 |
| JP | 2001166026 A | 6/2001 |
| JP | 2001512916 A | 8/2001 |
| JP | 3210915 B2 | 9/2001 |

(56) References Cited

FOREIGN PATENT DOCUMENTS

| | | |
|---|---|---|
| JP | 2001257626 A | 9/2001 |
| JP | 2001267987 A | 9/2001 |
| JP | 2001519113 | 10/2001 |
| JP | 2002009741 A | 1/2002 |
| JP | 2002506583 | 2/2002 |
| JP | 2002507342 A | 3/2002 |
| JP | 2002508129 A | 3/2002 |
| JP | 2002532008 T | 9/2002 |
| JP | 2002539711 A | 11/2002 |
| JP | 2002353824 | 12/2002 |
| JP | 2003051762 A | 2/2003 |
| JP | 2003152603 A | 5/2003 |
| JP | 2003194916 A | 7/2003 |
| JP | 2003244103 A | 8/2003 |
| JP | 2003338779 A | 11/2003 |
| JP | 2004048307 A | 2/2004 |
| JP | 2004112094 A | 4/2004 |
| JP | 2004511189 A | 4/2004 |
| JP | 2004512733 A | 4/2004 |
| JP | 2004159277 A | 6/2004 |
| JP | 2004166218 A | 6/2004 |
| JP | 2004194288 A | 7/2004 |
| JP | 2004531975 A | 10/2004 |
| JP | 2004343754 A | 12/2004 |
| JP | 2005065197 A | 3/2005 |
| JP | 2005510940 A | 4/2005 |
| JP | 2006503485 A | 1/2006 |
| JP | 2006180266 A | 7/2006 |
| JP | 2006191582 A | 7/2006 |
| JP | 2006191587 A | 7/2006 |
| JP | 2006314086 A | 11/2006 |
| JP | 2007503169 A | 2/2007 |
| JP | 2007195247 A | 8/2007 |
| JP | 2007524269 A | 8/2007 |
| JP | 2008053889 A | 3/2008 |
| JP | 2008199493 A | 8/2008 |
| JP | 2008278338 A | 11/2008 |
| JP | 2008539664 A | 11/2008 |
| JP | 2009515219 A | 4/2009 |
| JP | 2009545219 A | 12/2009 |
| JP | 2011521373 A | 7/2011 |
| JP | 2011524115 A | 8/2011 |
| KR | 20010031665 | 4/2001 |
| KR | 20010085143 A | 9/2001 |
| KR | 20020092136 | 12/2002 |
| KR | 20030059528 A | 7/2003 |
| KR | 20040097893 A | 11/2004 |
| KR | 20050073113 A | 7/2005 |
| KR | 20050097552 A | 10/2005 |
| KR | 20070091214 | 9/2007 |
| KR | 20070104633 A | 10/2007 |
| KR | 20080039772 A | 5/2008 |
| RU | 2211531 C2 | 8/2003 |
| RU | 2233033 C2 | 7/2004 |
| RU | 2233045 C2 | 7/2004 |
| RU | 2280329 C1 | 7/2006 |
| RU | 2301493 | 6/2007 |
| RU | 2319307 C2 | 3/2008 |
| RU | 2323529 C2 | 4/2008 |
| TW | 365717 | 8/1999 |
| TW | 200640202 | 11/2006 |
| TW | 200704232 | 1/2007 |
| WO | WO-9526593 | 10/1995 |
| WO | WO-9818212 | 4/1998 |
| WO | WO-9832231 A1 | 7/1998 |
| WO | 9857509 A2 | 12/1998 |
| WO | WO-9857452 A1 | 12/1998 |
| WO | WO-9901950 A2 | 1/1999 |
| WO | 9912273 | 3/1999 |
| WO | WO-9923844 A2 | 5/1999 |
| WO | WO-9929048 | 6/1999 |
| WO | WO-0033528 A1 | 6/2000 |
| WO | WO-0035126 A1 | 6/2000 |
| WO | 0055992 A1 | 9/2000 |
| WO | WO-0062456 A1 | 10/2000 |
| WO | WO-0070786 A1 | 11/2000 |
| WO | WO-0108324 | 2/2001 |
| WO | WO-0117158 | 3/2001 |
| WO | WO-0223792 A1 | 3/2002 |
| WO | 0232003 A1 | 4/2002 |
| WO | WO-0230004 | 4/2002 |
| WO | WO-0233877 A1 | 4/2002 |
| WO | WO02067444 A1 | 8/2002 |
| WO | WO-02103920 A2 | 12/2002 |
| WO | WO-03001834 A1 | 1/2003 |
| WO | WO-03017527 | 2/2003 |
| WO | WO-03021905 A1 | 3/2003 |
| WO | 03047124 A1 | 6/2003 |
| WO | WO-03067783 | 8/2003 |
| WO | WO-03079577 A2 | 9/2003 |
| WO | WO-03096635 A1 | 11/2003 |
| WO | WO-03105370 A1 | 12/2003 |
| WO | 2004010573 A1 | 1/2004 |
| WO | WO-2004015909 A1 | 2/2004 |
| WO | WO-2004025869 A2 | 3/2004 |
| WO | WO-2004025986 A2 | 3/2004 |
| WO | WO-2004032369 A2 | 4/2004 |
| WO | WO2004066666 | 8/2004 |
| WO | WO-2004084480 A1 | 9/2004 |
| WO | WO-2004102864 A1 | 11/2004 |
| WO | 2004107768 A2 | 12/2004 |
| WO | WO-2004114582 A1 | 12/2004 |
| WO | WO-2005020464 A1 | 3/2005 |
| WO | WO-2005034383 A2 | 4/2005 |
| WO | WO-2005036913 A1 | 4/2005 |
| WO | 2005053177 A1 | 6/2005 |
| WO | WO-2005060192 A1 | 6/2005 |
| WO | WO-2006004948 | 1/2006 |
| WO | WO-2006071761 | 7/2006 |
| WO | WO-2006115979 A1 | 11/2006 |
| WO | 2007000620 A1 | 1/2007 |
| WO | WO-2007016553 A1 | 2/2007 |
| WO | 2007029958 A1 | 3/2007 |
| WO | WO-2007024963 | 3/2007 |
| WO | 2007060093 A1 | 5/2007 |
| WO | WO-2007053840 | 5/2007 |
| WO | WO2007060229 A1 | 5/2007 |
| WO | WO2007140338 | 12/2007 |
| WO | WO-2008005890 | 1/2008 |
| WO | WO2008012265 A1 | 1/2008 |
| WO | WO-2008027192 A2 | 3/2008 |
| WO | WO-2008156061 A1 | 12/2008 |
| WO | WO-2009105611 A1 | 8/2009 |
| WO | WO2009108586 | 9/2009 |
| WO | WO-2009137464 A2 | 11/2009 |
| WO | WO2009140338 A2 | 11/2009 |
| WO | WO-2009152138 A2 | 12/2009 |
| WO | WO-2010014968 A1 | 2/2010 |

OTHER PUBLICATIONS

Huaiyu D Al, et al., "Asymptotic spectral efficiency of multi cell mimo systems with frequency-flat fading" IEEE Transactions on Signal Processing, IEEE Service Center, New York, NY, US, vol. 51, No. 11, Nov. 1, 2003, pp. 2676-2988, XP011102811.
International Search Report and Written Opinion—PCT/US2009/052596—International Search Authority, European Patent Office,Nov. 19, 2009.
Meyr H, et al., "Digital Communication Receivers, Chapter 5 (Synthesis of Synchronization Algorithms, Chapter 8 (Frequency Estimation)", Jan. 1, 1998, Digital Communication Receivers:Synchronization,Channel Estimation, and Signal Processing; [Wiley Series in Telecommunications and Signal Processing], John Wiley and Sons, New York, pp. 271-323,445, XP002547568.
Pais A V, et al., "Indoor DS-CDMA system deployment and performance with successive interference cancellation" Electronics Letters, IEE Stevenage, GB, vol. 40, No. 19, Sep. 16, 2004, pp. 1200-1201, XP006022654.
Ritt: "Performance of IDMA-based inter-cell interference cancellation" 3GPP Draft; R1-060895, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Mar. 20, 2006, XP050101801, pp. 1-5.

(56) References Cited

OTHER PUBLICATIONS

Chunguang, W., et al., "Enhanced OTDOA Technology in 3G Location Service", Shanghai Research Institute of China Telecom, Shanghai 200122, China, Aug. 31, 2005.
Natali F.D., "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.
Olivier J.C., et al., "Single antenna interference cancellation for synchronised GSM networks using a widely linear receiver" (Feb. 1, 2007) pp. 131-136, XP006028092.
Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.
Taiwan Search Report—TW098126096—TIPO—Mar. 1, 2013.
Xiaofa, L., "The study of Interference Cancellation based on Multi-User Detection", Chinese Scientific Papers Online, pp. 7, Mar. 27, 2008.
3rd Generation Partnership, Project 2 "3GPP2" Physical Layer Standard for cdma2000,Spread Spectrum Systems. Revision D, 3GPP2 C.S0002-D, Version 2.0, Sep. 30, 2005 (538 pages).
Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008, pp. 721-724, XP031312823 ISBN: 978-1-4244-2540-9.
Divsalar, D., et al., "Improved parallel interference cancellation for CDMA", Communications, IEEE Transactions on, Feb. 1998, vol. 46, Issue: 2, pp. 258-268.
JVT: "Draft ITU-T Recommendation and Final Draft International Standard of Joint Video Specification (ITU-T Rec. H .264 ISO/IEC 14496-10 AVC)", 7. JVT Meeting; 64. MPEG Meeting; Mar. 7, 2003-Mar. 14, 2003; Pattaya,TH; (Joint Video Team of ISO/IEC JTC1/SC29/WG11 and ITU-T 56.16), No. JVT-G050r1, Mar. 14, 2003 , XP030005712, ISSN: 0000-0427.
Lakkavalli, S., et al., "Stretchable Architectures for Next Generation Cellular Networks", ISART'03, Mar. 4, 2003, 7 pages.
NTT DoCoMo: "Text proposals for detailed channel coding," 3GPP TSG-RAN WG1#7, R1-99b49, Aug. 1999, pp. 24.
"Soft Handoff and Power Control in IS-95 CDMA", CDMA95.10, Dec. 6, 1999, pp. 181-212.
Tseng, S-M., et al., Fuzzy adaptive parallel interference cancellation and vector channel prediction for CDMA in fading channels, Communications, 2002. ICC 2002. IEEE International Conference on, 2002, vol. 1, pp. 252-256.
Qualcomm Europe: "On E-DCH structure", 3GPP Draft, R1-040538, 3rd Generation Partnership Project (3GPP), Mobile Competence Centre, 650, Route Des Lucioles, F-06921 Sophia-Antipolis Cedex, France, vol. RAN WG1, no. Montreal, Canada, May 6, 2004, XP050098746, [retrieved on May 6, 2004] * Section 3 *.
Qualcomm Incorporated: "Introducing Enhancements to CS voice over DCH," 3GPP Draft; R1-123809 (3GPP),Mobile Competence Centre ; 650, Route Des Lucioles ; F-06921 Sophia-Antipolis Cedex ; FR, vol. RAN WG1, no. Qingdao, China; Aug. 13, 2012-Aug. 17, 2012 Aug. 5, 2015. XP050661662.
Wu Q ., et al., "The cdma2000 High Rate Packet Data System", Internet Citation, Mar. 26, 2002, XP002303829, Retrieved from the Internet: URL: http://www.qualcomm.com/technology/1xe v-do/publishedpapers/cdma2000HighRatePacket.pdf [retrieved on Nov. 3, 2004] Sections 3.1.7 and 3.2.
Philips, "Mapping of Transport Channels to Physical Channels [online]," 3GPP TSG-RAN WG2#51 R2-060424, <URL: http://www.3gpp.org/ftp/tsg_ran/WG2_RL2/TSGR2_51/Documents/R2-060424.zip>, Feb. 2006.

\* cited by examiner

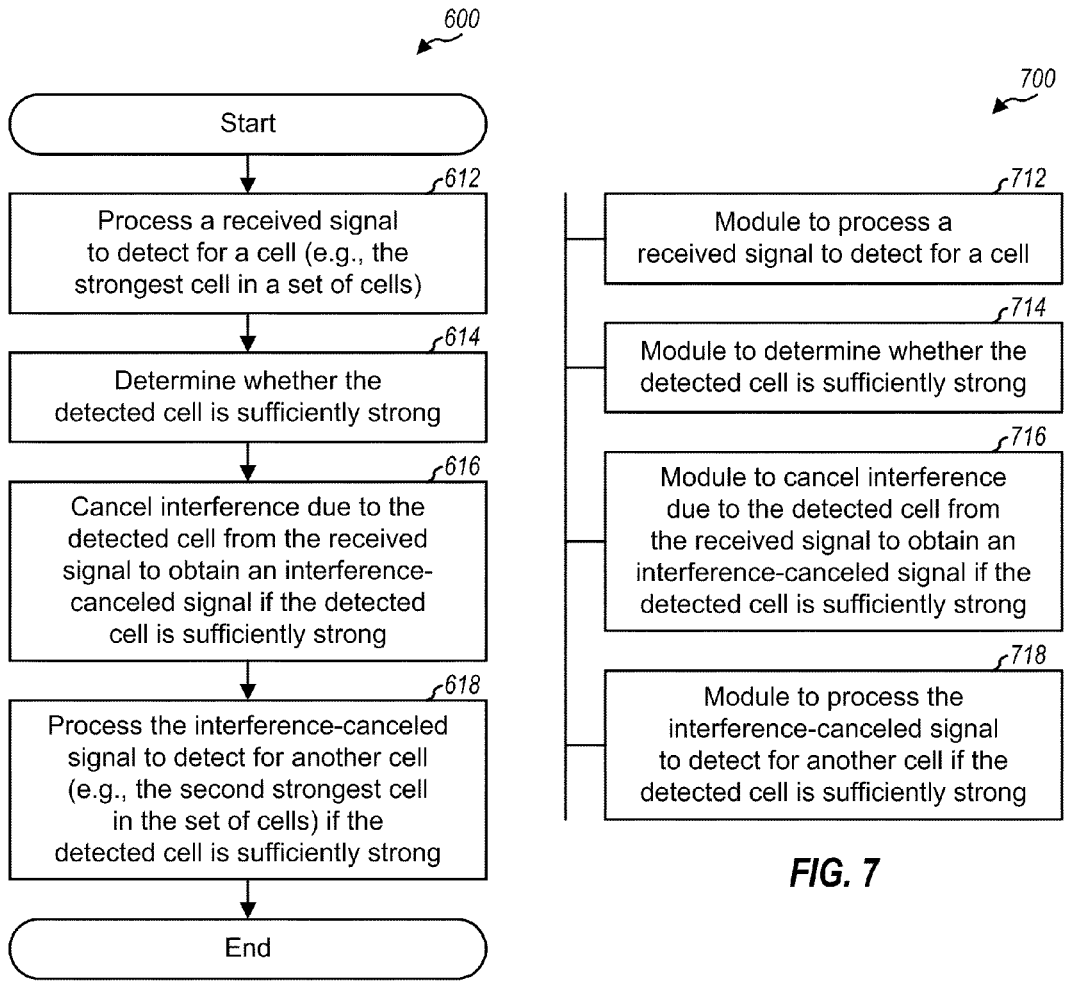

SUCCESSIVE DETECTION AND CANCELLATION FOR CELL PILOT DETECTION

The present application claims priority to provisional U.S. Application Ser. No. 61/085,754, entitled "CELL PILOT DETECTION," filed Aug. 1, 2008, assigned to the assignee hereof and incorporated herein by reference.

BACKGROUND

I. Field

The present disclosure relates generally to communication, and more specifically to techniques for detecting for cells in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user equipments (UEs). A UE may be within the coverage of one or more cells at any given moment, e.g., depending on the current UE location. The UE may not know which cells are within range. The UE may perform a search to detect for cells and to acquire timing and other information for the detected cells. It may be desirable to detect for cells in a manner to obtain good performance, e.g., to detect as many cells as possible.

SUMMARY

Techniques for performing cell detection with successive detection and cancellation (SDC) are described herein. For SDC, signals (e.g., pilots) from stronger cells may be canceled from a received signal at a UE so that the interference from the stronger cells may be significantly reduced. Weaker cells may be detected as a result of the reduced interference from the stronger cells.

In one design, a UE may process a received signal to detect for a cell. The UE may process the received signal to detect for common pilots transmitted by cells with a reuse factor of one, for low reuse pilots transmitted by cells with a reuse factor greater than one, etc. The UE may determine whether the detected cell is sufficiently strong. If the cell is sufficiently strong, then the UE may cancel the interference due to the detected cell from the received signal to obtain an interference-canceled signal and may further process the interference-canceled signal to detect for another cell. In one design, the UE may detect for cells in a set of cells in a sequential order, from the strongest cell to the weakest cell. The UE may process the received signal to detect for the strongest cell in the set and may process the interference-canceled signal to detect for the second strongest cell in the set. The UE may terminate detection when a cell not sufficiently strong is detected or when all cells in the set have been detected.

Various aspects and features of the disclosure are described in further detail below.

BRIEF DESCRIPTION OF THE DRAWINGS

FIG. 6 shows a process for performing cell detection with SDC.
FIG. 7 shows an apparatus for performing cell detection with SDC.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
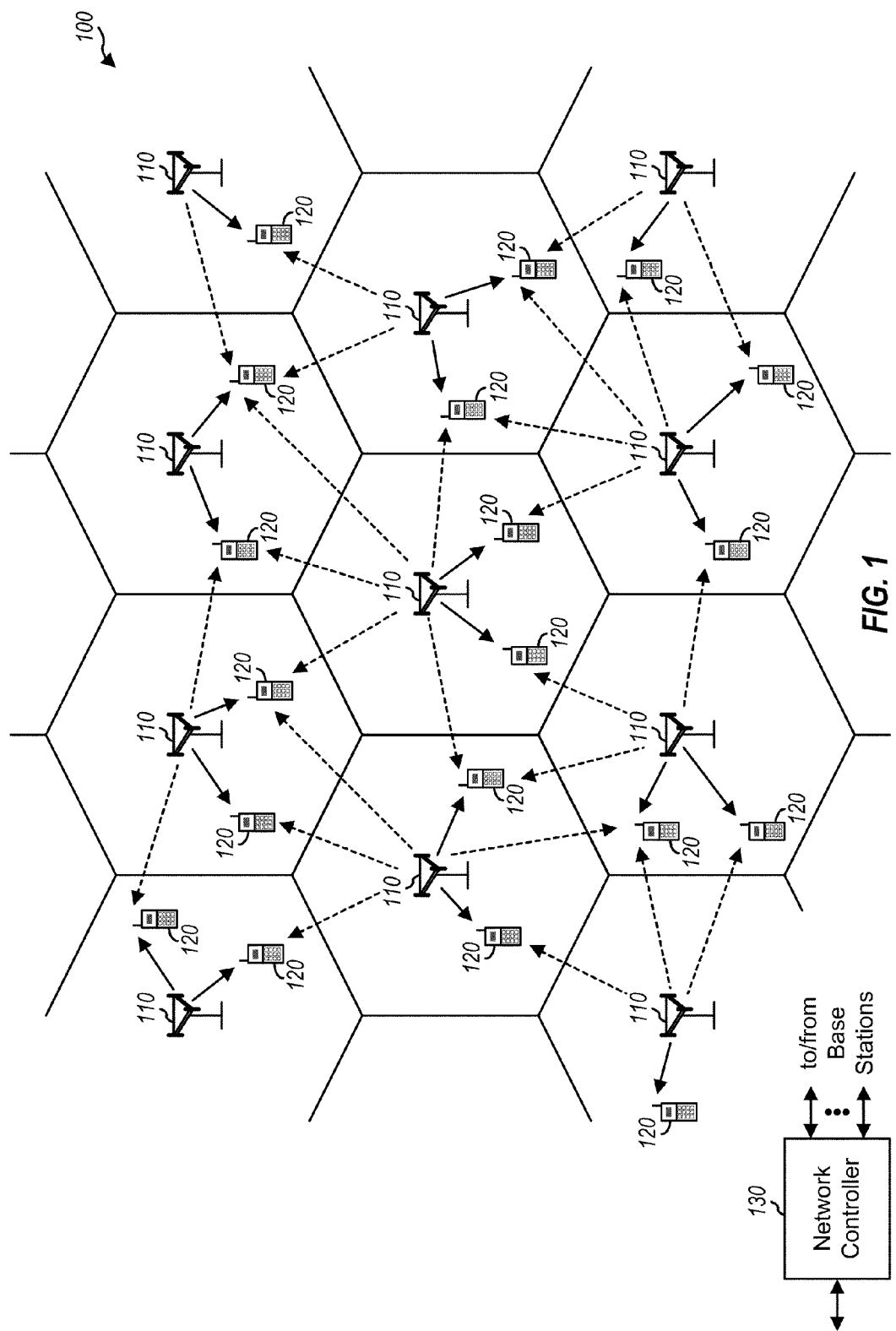
FIG. 1 shows a wireless communication network.

FIG. 1 shows a wireless communication network 100 with multiple base stations 110. A base station may be a station that communicates with the UEs and may also be referred to as a Node B, an evolved Node B (eNB), an access point, etc. Each base station 110 may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description below. A base station may support one or multiple (e.g., three) cells.

Wireless network 100 may be a homogeneous network that includes base stations of one type, e.g., only macro base stations. Wireless network 100 may also be a heterogeneous network that includes base stations of different types, e.g., macro, pico, and/or femto base stations that provide coverage for macro, pico and/or femto cells, respectively. A macro base station may cover a relatively large geographic area (e.g., several kilometers in radius) and may allow unrestricted access by UEs with service subscription. A pico base station may cover a relatively small geographic area and may allow unrestricted access by UEs with service subscription. A femto or home base station may cover a relatively small geographic area (e.g., a home) and may allow restricted access by UEs having association with the femto cell (e.g., UEs for users in the home). Wireless network 100 may also include relay stations. The techniques described herein may be used for both homogeneous and heterogeneous networks. A network controller 130 may couple to a set of base stations and provide coordination and control for the base stations.

UEs 120 may be dispersed throughout wireless network 100, and each UE may be stationary or mobile. A UE may also be referred to as a mobile station, a terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a base station via the downlink and uplink. The downlink (or forward link) refers to the communication link from the base station to the UE, and the uplink (or reverse link) refers to the communication link from the UE to the base station. In FIG. 1, a solid line with a single arrow indicates a UE receiving a data transmission from a serving cell, and a dashed line with a single arrow indicates a UE receiving pilot from a cell. Uplink transmissions are not shown in FIG. 1.

Wireless network 100 may utilize a reuse factor of one, which means that a given frequency channel may be used by all cells in the wireless network. Using a reuse factor of one may improve spectral efficiency and may also reduce complexity of frequency planning in wireless network 100.

Each cell in wireless network 100 may transmit a common pilot, which may be used by UEs for cell detection, time synchronization, channel estimation, etc. A pilot is a signal or transmission that is known a priori by a transmitter and a receiver. A pilot may also be referred to as a reference signal, a preamble, etc. A common pilot is a pilot transmitted to all UEs. A common pilot may also be referred to as a cell-specific reference signal, etc.

A UE may have difficulty detecting the common pilots from neighboring cells due to strong interference from the closest cells. This near-far effect may result in a hearability problem, which may reduce accuracy of cellular network-based positioning of the UE. The hearability problem may be mitigated by increasing pilot processing gain, e.g., by transmitting more pilot symbols for the common pilots on more resources. However, pilot processing gain may not be a feasible solution to the near-far problem due to physical resource limitation and/or channel coherence time.

In an aspect, a UE may perform successive detection and cancellation (SDC) to detect for cells in the wireless network. For SDC, the UE may process a received signal to detect for pilots from one or more cells. The UE may estimate the interference due to a detected cell (e.g., the strongest detected cell) and may cancel the estimated interference from the received signal. The UE may be able to detect pilots from more cells (e.g., from weaker cells) by canceling the interference due to the pilots from the detected cells. SDC may improve the hearability of weaker cells and may enable the UE to detect more cells. SDC may be used for both common pilots and low reuse pilots.

At a given UE, a received signal comprising pilot signals from different cells may be expressed as:

$$y(t) = \sum_{k \in \Omega} \sum_{\{\tau_k\}} \alpha_{\tau_k}^k \cdot x_k(t - \tau_k) + n(t), \text{ for } 0 < t < T_s, \quad \text{Eq (1)}$$

where $x_k(t)$ is a pilot signal from cell k at time t, which is known to the UE, $y(t)$ is the received signal at the UE, $T_s$ is the length of the pilot signal, $\tau_k$ is the delay of a channel tap for cell k, $\alpha_{\tau_k}^k$ is a complex gain of the channel tap for cell k at delay $\tau_k$, $\{\tau_k\}$ is a set of tap delays for cell k, $\Omega$ is a set of cells of interest, e.g., cells to be detected, and $n(t)$ is thermal noise at the UE.

A pilot signal may be a cell signature bearing pilot symbol and may span one OFDM symbol period, one time slot, or some other duration. A pilot signal may be generated in different manners for different systems.

The channel tap gain $\alpha_{\tau_k}^k$ may be assumed to be (i) Gaussian with zero mean and variance $\sigma_{\tau_k}^2$ and (ii) constant over the interval [0, $T_s$] of the pilot signals. The thermal noise n(t) may be assumed to be additive white Gaussian noise (AWGN) with zero mean and variance $\sigma_n^2$. The thermal noise may be small compared to the total received power at the UE and, for simplicity, may be ignored in much of the description below.

The UE may use a searcher to detect for pilots from cells. The searcher may correlate the received signal with a locally generated pilot signal for cell k to detect for cell k. The output of the searcher for cell k may be expressed as:

$$z_k(\tau) = \frac{1}{T_s} \sum_{0<t<T_s} y(t+\tau) \cdot x_k^*(t) \quad \text{Eq (2)}$$

$$= \frac{1}{T_s} \sum_{0<t<T_s} \left( \sum_{j \in \Omega} \sum_{\{\tau_j\}} \alpha_{\tau_j}^j \cdot x_j(t+\tau-\tau_j) \cdot x_k^*(t) + n(t) \right)$$

$$= \frac{1}{T_s} \sum_{j \in \Omega} \sum_{\{\tau_j\}} \alpha_{\tau_j}^j \sum_{0<t<T_s} x_j(t+\tau-\tau_j) \cdot x_k^*(t) + n(t),$$

where $z_k(\tau)$ is the searcher output for cell k for time offset $\tau$, and

"*" denotes a complex conjugate.

A search may be performed over a search window $\Phi$, which may cover the duration of the pilot signals. The searcher output when $\tau \neq \tau_k$ may be expressed as:

$$z_0^k = \frac{\zeta}{T_s} \sum_{j \in \Omega} \sum_{\{\tau_j\}} \alpha_{\tau_j}^j + n(t), \quad \text{Eq (3)}$$

where $\zeta$ is defined below.

The searcher output when $\tau = \tau_k$ may be expressed as:

$$z_1^k = \frac{\zeta}{T_s} \sum_{j \in \Omega, \tau_j \neq \tau_k} \sum \alpha_{\tau_j}^j + \alpha_{\tau_j}^k + n(t). \quad \text{Eq (4)}$$

Equations (3) and (4) assume the following:

$$\sum_{0<t<T_s} x_j(t+\tau-\tau_j) \cdot x_k^*(t) = \begin{cases} T_s & \text{for } k = j \text{ and } \tau = \tau_j \\ \zeta & \text{otherwise.} \end{cases} \quad \text{Eq (5)}$$

If the pilot signal for cell k is generated based on a pseudo-random number (PN) sequence, then $\zeta=-1$. Both $z_0^k$ and $z_1^k$ are Gaussian with zero mean and variances $\sigma_{z_0}^{k\,2}$ and $\sigma_{z_1}^{k\,2}$, respectively, which may be expressed as:

$$\sigma_{z_0}^2 = \left(\frac{\zeta}{T_s}\right)^2 \sum_{j \in \Omega} \sum_{\{\tau_j\}} \sigma_{\tau_j}^2 + \sigma_n^2, \qquad \text{Eq (6)}$$

and $$\sigma_{z_1}^2 = \sigma_{\tau_k}^2 + \left(\frac{\zeta}{T_s}\right)^2 \sum_{j \in \Omega} \sum_{\tau_j \neq \tau_k} \sigma_{\tau_j}^2 + \sigma_n^2. \qquad \text{Eq (7)}$$

The UE may declare detection of cell k if the following condition is true:

$$|z_k(\tau)|^2 > \lambda_{det}, \qquad \text{Eq (8)}$$

where $\lambda_{det}$ is a detection threshold.

A detection probability $P_d^k$, which is the probability of detecting cell k when it is present, may be expressed as:

$$P_d^k = 1 - \exp\left(\frac{-\lambda}{2\sigma_{z_1^k}^2}\right). \qquad \text{Eq (9)}$$

A false detection probability $P_f^k$, which is the probability of detecting cell k when it is not present, may be expressed as:

$$P_f^k = 1 - \exp\left(\frac{-\lambda}{2\sigma_{z_0^k}^2}\right). \qquad \text{Eq (10)}$$

If cell k is much weaker than the other cells, e.g., if $\sigma_{r_k}^2/\sigma_{r_i}^2 \ll 1$ and $\sigma_{z_1}^{k\,2} \approx \sigma_{z_0}^{k\,2}$, then the detection probability for cell k may be small, and $P_d^k \approx P_f^k$.

SDC may be used to combat the near-far effect and increase hearability of cells. A processing/search window for SDC may be limited to $[\Delta, T_s-\delta]$, instead of the entire pilot signal interval $[0, T_s]$, in order to avoid inter-symbol interference. $\Delta$ is the front portion of the pilot signal that is not used for SDC in order to avoid time delay spread from the pilot signal in the previous interval. $\delta$ is the end portion of the pilot signal to account for potential timing error to prevent the energy from the pilot signal in the next interval from leaking into the search window. For an OFDM system, the pilot signal may correspond to an OFDM symbol, and $\Delta$ may be equal to the cyclic prefix length. For simplicity, the received signal in the search window may be defined as:

$$r(t) = \sum_k \sum_{\tau_k} \alpha_{\tau_k}^k \cdot s_k(t - \tau_k), \text{ for } 0 < t < T_s', \qquad \text{Eq (11)}$$

where $r(t)=y(t+\Delta)$, $s(t)=x(t+\Delta)$, and $T'_s=T_s-\Delta-\delta$.

In one design of SDC, the strongest cell may first be detected by scanning the received signal for each cell. For each cell k, the received signal may be correlated with the pilot signal for cell k at each time offset in the search window. The time offset $\hat{\tau}_k$ with the largest correlation result for cell k may be expressed as:

$$\hat{\tau}_k = \underset{\tau \in \Phi}{\operatorname{argmax}} \left| \sum_{0 \le t \le T_s'} r(t) \cdot s_k^*(t - \tau) \right|^2. \qquad \text{Eq (12)}$$

The channel gain $\hat{\alpha}_{\tau_k}^k$ for cell k at time offset $\hat{\tau}_k$ may be expressed as:

$$\hat{\alpha}_{\hat{\tau}_k}^k = \frac{1}{T_s'} \sum_{0 \le t \le T_s'} r(t) \cdot s_k^*(t - \hat{\tau}_k). \qquad \text{Eq (13)}$$

The interference $i_k(t)$ from cell k due to the channel tap at time offset $\hat{\tau}_k$ may be expressed as:

$$i_k(t) = \hat{\alpha}_{\hat{\tau}_k}^k \cdot s_k(t - \hat{\tau}_k). \qquad \text{Eq (14)}$$

The interference from cell k may be canceled from the received signal to obtain an interference-canceled signal. The variance $\hat{\sigma}_{\hat{\tau}_k}^2$ of the residual interference may be estimated from the interference-canceled signal, as follows:

$$\hat{\sigma}_{\hat{\tau}_k}^2 = \frac{1}{T_s'} \sum_{0 \le t \le T_s'} |r(t) - i_k(t)|^2. \qquad \text{Eq (15)}$$

A signal-to-noise-and-interference ratio (SINR) for cell k may be expressed as:

$$SINR_k = \frac{|\hat{\alpha}_{\hat{\tau}_k}^k|^2}{\hat{\sigma}_{\hat{\tau}_k}^2}. \qquad \text{Eq (16)}$$

In one design, cell k may be deemed to be sufficiently strong if its SINR exceeds an SINR threshold $\lambda$, as follows:

$$SINR_k > \lambda. \qquad \text{Eq (17)}$$

The test for whether cell k is sufficiently strong may also be based on other metrics, e.g., the detected energy of cell k, which may be $E_k = |\hat{\alpha}_{\hat{\tau}_k}^k|^2$.

If cell k is sufficiently strong, then the interference due to cell k may be canceled from the received signal, as follows:

$$r_k(t) = r(t) - i_k(t), \text{ for } 0 < t < T_s', \qquad \text{Eq (18)}$$

where $r_k(t)$ is an interference-canceled signal with the interference from cell k canceled.

In one design, cell k may be deemed to be sufficiently strong or not based on its SINR (or some other metric) for the time offset with the largest correlation result. If cell k is sufficiently strong, then the interference due to cell k may be canceled from the received signal. A channel profile for cell k may be estimated and used for position determination to estimate the location of the UE.

In another design, cell k may be deemed to be sufficiently strong or not based on its overall SINR (or some other metric), which may be determined based on all time offsets with sufficiently large correlation results. In this design, the SDC processing may be iterated for up to I times for cell k, where I may be any suitable value. In iteration i, where $0 < i \le I$, a channel tap at a new time offset $\hat{\tau}_{k,i}$ with the largest correlation result for cell k may be determined, as follows:

$$\hat{\tau}_{k,i} = \underset{\tau \in \Phi}{\arg\max} \left| \sum_{0 \le t \le T'_s} q_{k,i}(t) \cdot s_k^*(t-\tau) \right|^2, \quad \text{Eq (19)}$$

where $q_{k,i}(t)$ is a received signal for iteration i for cell k. For the first iteration with i=1, $q_{k,1}(t)$ may be equal to (i) the received signal r(t) if cell k is the first cell being detected or (ii) an interference-canceled signal after canceling interference from prior detected cells. For each subsequent iteration, $q_{k,i}(t)$ may be equal to an interference-canceled signal from a prior iteration for cell k.

A channel gain $\hat{\alpha}_{\hat{\tau}_{k,i}}^k$ for cell k at time offset $\hat{\tau}_{k,i}$ may be expressed as:

$$\hat{\alpha}_{\hat{\tau}_{k,i}}^k = \frac{1}{T'_s} \sum_{0 \le t \le T'_s} q_{k,i}(t) \cdot s_k^*(t - \hat{\tau}_{k,i}). \quad \text{Eq (20)}$$

The interference $i_{k,i}(t)$ from cell k due to the channel tap at time offset $\hat{\tau}_{k,i}$ may be expressed as:

$$i_{k,i}(t) = \hat{\alpha}_{\hat{\tau}_{k,i}}^k \cdot s_k(t - \hat{\tau}_{k,i}). \quad \text{Eq (21)}$$

The SINR for cell k at time offset $\hat{\tau}_{k,i}$ may be expressed as:

$$SINR_{k,i} = \frac{|\hat{\alpha}_{\hat{\tau}_{k,i}}^k|^2}{\hat{\sigma}_{\hat{\tau}_{k,i}}^2} = \frac{T'_s |\hat{\alpha}_{\hat{\tau}_{k,i}}^k|^2}{\sum_{0 \le t \le T'_s} |q_{k,i}(t) - i_{k,i}(t)|^2}. \quad \text{Eq (22)}$$

The channel tap at time offset $\hat{\tau}_{k,i}$ may be deemed to be sufficiently strong if the following condition is true:

$$SINR_{k,i} > \lambda_1, \quad \text{Eq (23)}$$

where $\lambda_1$ is a threshold for identifying a sufficiently strong channel tap.

If the channel tap at time offset $\hat{\tau}_{k,i}$ is sufficiently strong, then the interference due to this channel tap may be canceled from the received signal, as follows:

$$q_{k,i+1}(t) = q_{k,i}(t) - i_{k,i}(t), \text{ for } 0 < t < T'_s, \quad \text{Eq (24)}$$

where $q_{k,i+1}(t)$ is an interference-canceled signal for the next iteration. Otherwise, if the channel tap at time offset $\hat{\tau}_{k,i}$ is not sufficiently strong, then the processing for cell k may terminate.

The overall SINR for cell k may be determined based on all channel taps that are sufficiently strong, as follows:

$$SINR_{overall,k} = \sum_{\{\hat{\tau}_{k,i}\}} \frac{|\hat{\alpha}_{\hat{\tau}_{k,i}}^k|^2}{\hat{\sigma}_{\hat{\tau}_{k,i}}^2} = \sum_{\{\hat{\tau}_{k,i}\}} \frac{T'_s |\hat{\alpha}_{\hat{\tau}_{k,i}}^k|^2}{\sum_{0 \le t \le T'_s} |q_{k,i}(t)|^2}, \quad \text{Eq (25)}$$

where $\{\hat{\tau}_{k,i}\}$ denotes a set of time offsets for cell k with sufficiently high SINR.

The overall SINR for cell k may be compared against a threshold $\lambda_2$, as follows:

$$SINR_{overall,k} > \lambda_2 \quad \text{Eq (26)}$$

If the condition in equation (26) is met, then cell k may be deemed to be sufficiently strong, and the interference due to cell k may be canceled from the received signal. A channel profile for cell k may be estimated and used for location estimation.

The interference-canceled signal for detecting the next cell may be expressed as:

$$r_k(t) = q_{k,1}(t) - \sum_{\{\hat{\tau}_{k,i}\}} \hat{\alpha}_{\hat{\tau}_{k,i}}^k \cdot s_k(t - \hat{\tau}_{k,i}), \text{ for } 0 < t < T'_s, \quad \text{Eq (27)}$$

where $\{\hat{\tau}_{k,i}\}$ denotes a set of sufficiently strong channel taps for cell k, and $q_{k,1}(t)$ is a received signal used to detect for strong channel taps for cell k.

The interference-canceled signal for detecting the next cell may also be expressed as:

$$r_k(t) = r(t) - \sum_{\{k\}} \sum_{\{\hat{\tau}_{k,i}\}} \hat{\alpha}_{\hat{\tau}_{k,i}}^k \cdot s_k(t - \hat{\tau}_{k,i}), \text{ for } 0 < t < T'_s, \quad \text{Eq (28)}$$

where $\{k\}$ denotes a set of cells already detected.

The SDC processing described above may be repeated for all cells in set $\Omega$. For position determination/location estimation, only cells located in different base stations (i.e., non co-located cells) may be of interest. In this case, the detected cells may be examined, and only cells belonging to different base stations may be provided for position determination.

For simplicity, SDC processing for one search window has been described above. The search window may cover pilot signals in one interval, e.g., one OFDM symbol period, one time slot, etc. The SDC processing may be performed for multiple intervals to obtain time diversity and improve detection performance. The detected cells obtained over the multiple intervals may be provided as the search result.

Figure 2:
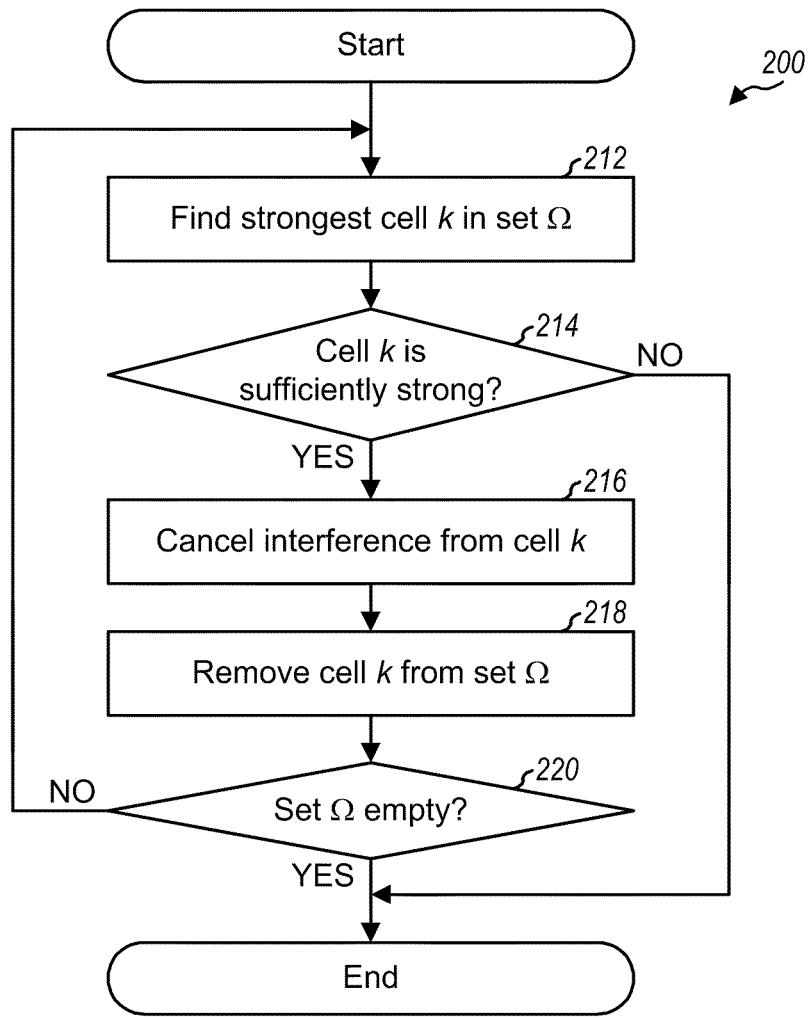
FIG. 2 shows a process for detecting for cells with SDC.

FIG. 2 shows a design of a process 200 for detecting for cells with SDC. Initially, a search may be performed to find the strongest cell k in set $\Omega$ (block 212). The search may be performed in different manners for different systems. In one design, correlation may be performed for each cell in set $\Omega$ at different time offsets, and the cell with the largest correlation result may be deemed as the strongest cell. The strongest cell may also be found in other manners and based on various metrics.

A determination may be made whether cell k is sufficiently strong (block 214). This may be achieved by comparing the SINR of cell k against a threshold, e.g., as shown in equation (17). Cell k may also be deemed to be sufficiently strong or not based on other metrics. If cell k is sufficiently strong, then interference from cell k may be estimated and canceled from the received signal (block 216). Cell k may then be removed from set $\Omega$ (block 218). A determination may then be made whether set $\Omega$ is empty (block 220). If set $\Omega$ is not empty, then the process may return to block 212 to find the next strongest cell in set $\Omega$. Otherwise, if cell k is not sufficiently strong (as determined in block 214) or if set $\Omega$ is empty (as determined in block 220), then the process terminates.

For the design in FIG. 2, the cells in set $\Omega$ may be detected in a sequential order, starting with the strongest cell, then the next strongest cell, etc. For this design, if cell k is not sufficiently strong, then remaining cells would also not be sufficiently strong, and the process may terminate. Detecting for cells in a sequential order may improve interference cancellation.

Figure 3:
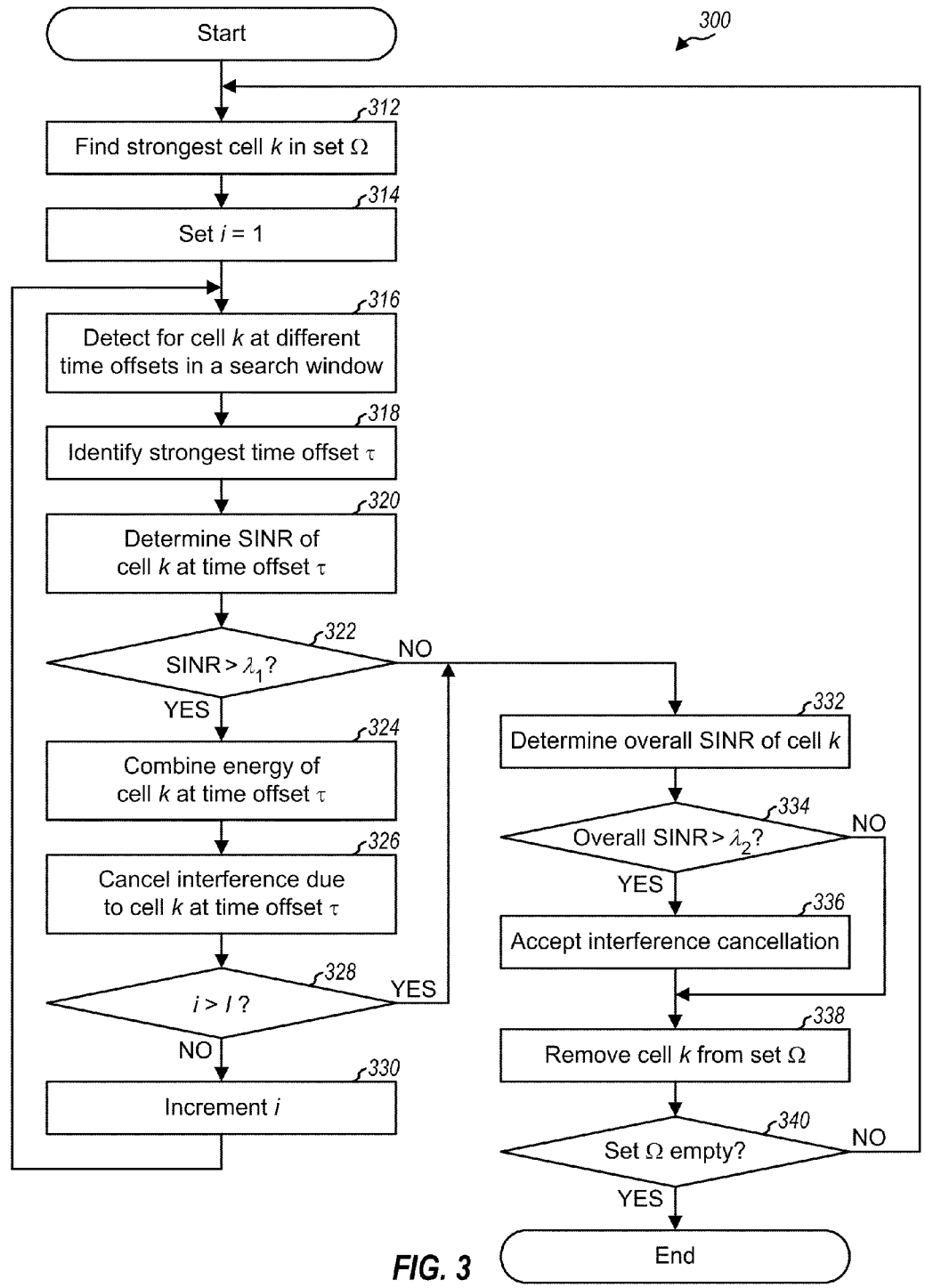
FIG. 3 shows another process for detecting for cells with SDC.

FIG. 3 shows a design of a process 300 for detecting for cells with SDC. Process 300 determines whether a cell is sufficiently strong based on all channel taps with sufficient energy for the cell. Initially, a search may be performed to find the strongest cell k in set Ω (block 312). Strong channel taps for cell k may then be identified in an iterative manner.

Index i for iteration number may be initialized to 1 for the first iteration (block 314). Correlation may then be performed to detect for cell k at different time offsets within a search window (block 316). The time offset τ with the strongest channel tap may be identified (block 318). The SINR (or some other metric) may be determined for cell k at time offset τ (block 320). A determination may then be made whether the SINR is sufficiently high, e.g., larger than threshold $\lambda_1$ (block 322). If the SINR is sufficiently high, then the energy of cell k at time offset τ may be combined with the energy of other strong time offsets, if any (block 324). In one design, the interference due to cell k at time offset τ may be estimated and cancelled (block 326). This may improve detection of the next channel tap for cell k. In another design, interference cancellation is not performed for each channel tap and may instead be performed after all channel taps have been detected. In any case, a determination may be made whether all iterations have been performed for cell k (block 328). If the answer is 'no', then index i may be incremented (block 330), and the process may return to block 316 to detect for another strong channel tap for cell k.

If all iterations have been completed for cell k (as determined in block 328) or if the strongest time offset for cell k is not sufficiently strong (as determined in block 322), then the overall SINR of cell k may be determined based on all sufficiently strong channel taps for cell k (block 332). A determination may then be made whether the overall SINR is sufficiently high, e.g., larger than threshold $\lambda_2$ (block 334). If the overall SINR is sufficiently high, then the interference cancellation for cell k may be accepted (block 336). Otherwise, the interference cancellation for cell k may be skipped, and the received signal used for the first iteration for cell k in block 316 may be used for the next cell. In either case, cell k may be removed from set Ω (block 338). A determination may then be made whether set Ω is empty (block 340). If set Ω is not empty, then the process may return to block 312 to find the next strongest cell in set Ω. Otherwise, the process terminates.

FIGS. 2 and 3 show two exemplary designs of cell detection with SDC. These designs detect for cells in a sequential order, starting with the strongest cell. SDC may also be performed in other manners, as described below.

SDC may be used for various types of pilots transmitted by cells. For example, SDC may be used for common pilots, which may be transmitted periodically by cells with a reuse factor of one. SDC may also be used for low reuse pilots (LRPs), which may be transmitted by cells with a reuse factor greater than one, so that only a fraction of the cells may transmit their low reuse pilots on a given time and/or frequency resource. For example, with a reuse factor of M, where M>1, only one out of every M cells may transmit its low reuse pilot on a given resource. A higher reuse factor (i.e., a larger value of M) corresponds to lower reuse, and vice versa. A low reuse pilot from a cell may observe less interference from low reuse pilots from other cells, which may enable detection of the low reuse pilot by more UEs. The low reuse pilots may thus have wider coverage and better hearability than the common pilots. A UE may be able to detect cells farther away based on the low reuse pilots transmitted by these cells. A low reuse pilot may also be referred to as a highly detectable pilot (HDP), a positioning assistance reference signal (PA-RS), a low reuse preamble, etc.

In one design, certain time slots may be reserved for low reuse pilots, or HDP. A given cell x may transmit its low reuse pilot in some of the reserved time slots. For example, M time slots may be reserved for low reuse pilots in each pilot cycle. Cell x may pseudo-randomly select one of the M reserved time slots and may transmit its low reuse pilot in the selected time slot.

In another design, certain subframes may be reserved for low reuse pilots, or PA-RS. Cell x may transmit its PA-RS in each symbol period not use for the reference signal or control information in a reserved subframe. In each symbol period with a PA-RS transmission, cell x may transmit the PA-RS on every sixth subcarrier starting with a particular subcarrier. Different starting subcarriers may be used in different PA-RS symbol periods to allow the PA-RS to be transmitted on all or most of the NFFT total subcarriers. The starting subcarriers may change over time to avoid continual collision with the PA-RS from the same strong neighbor cell. Cell x may generate an OFDM symbol comprising a PA-RS transmission in each symbol period that may be used for the PA-RS.

In general, low reuse pilots use multiplexing to reduce the chances of collision between pilots from strong cells and pilots from weak cells. This may then increase the opportunity for weak cells to be heard. This requires the wireless network to support a low reuse pilot for each cell. SDC may improve the hearability of weak cells without assistance from the wireless network.

Detection performance with SDC and/or low reuse pilots was ascertained via computer simulation. The computer simulation models a cellular network with 37 base stations, with each base station having three cells, and each cell having a radius of 750 meters. In the simulation, each cell transmits a common pilot with a reuse factor of one and a low reuse pilot with a reuse factor of greater than one. A number of UEs are randomly placed throughout the center cell in the cellular network. Each UE can detect for the common pilots or the low reuse pilots with or without SDC.

The computer simulation indicates that the hearability of the common pilots without SDC is generally poor. UEs located near the middle of a given cell x can detect only one or few cells due to strong interference from cell x. UEs located at the edges of cell x may be able to detect more cells due to less interference from cell x. The computer simulation indicates that the hearability with SDC may be better than the hearability with the low reuse pilots, except at locations close to cell x transmitter. The computer simulation also indicates that the hearability of the low reuse pilots with SDC is much improved over both (i) the hearability of the low reuse pilots without SDC (ii) the hearability of the common pilots with SDC.

SDC may thus be used to improve detection performance and may be applicable for both the common pilots and the low reuse pilots. SDC can provide good detection performance even with a small reuse factor. It can be shown that detection performance for the low reuse pilots with M=4 and SDC is better than detection performance for the low reuse pilots with M=8 and no SDC. SDC may thus be used to improve detection performance and/or reduce the reuse factor M.

The cell detection techniques described herein may be used for various applications such as positioning of UEs. A UE may detect for pilots (e.g., common pilots and/or low reuse pilots) from different cells with SDC to increase the number of cells that can be detected. The UE may obtain a time measurement (e.g., a time of arrival (TOA) measurement) based on the pilot from each detected cell. A location estimate for the UE may be derived based on the time measurements for the detected cells and their known locations using trilateration. The accuracy of the location estimate may improve and the location error may reduce with more detected cells.

Figure 4:
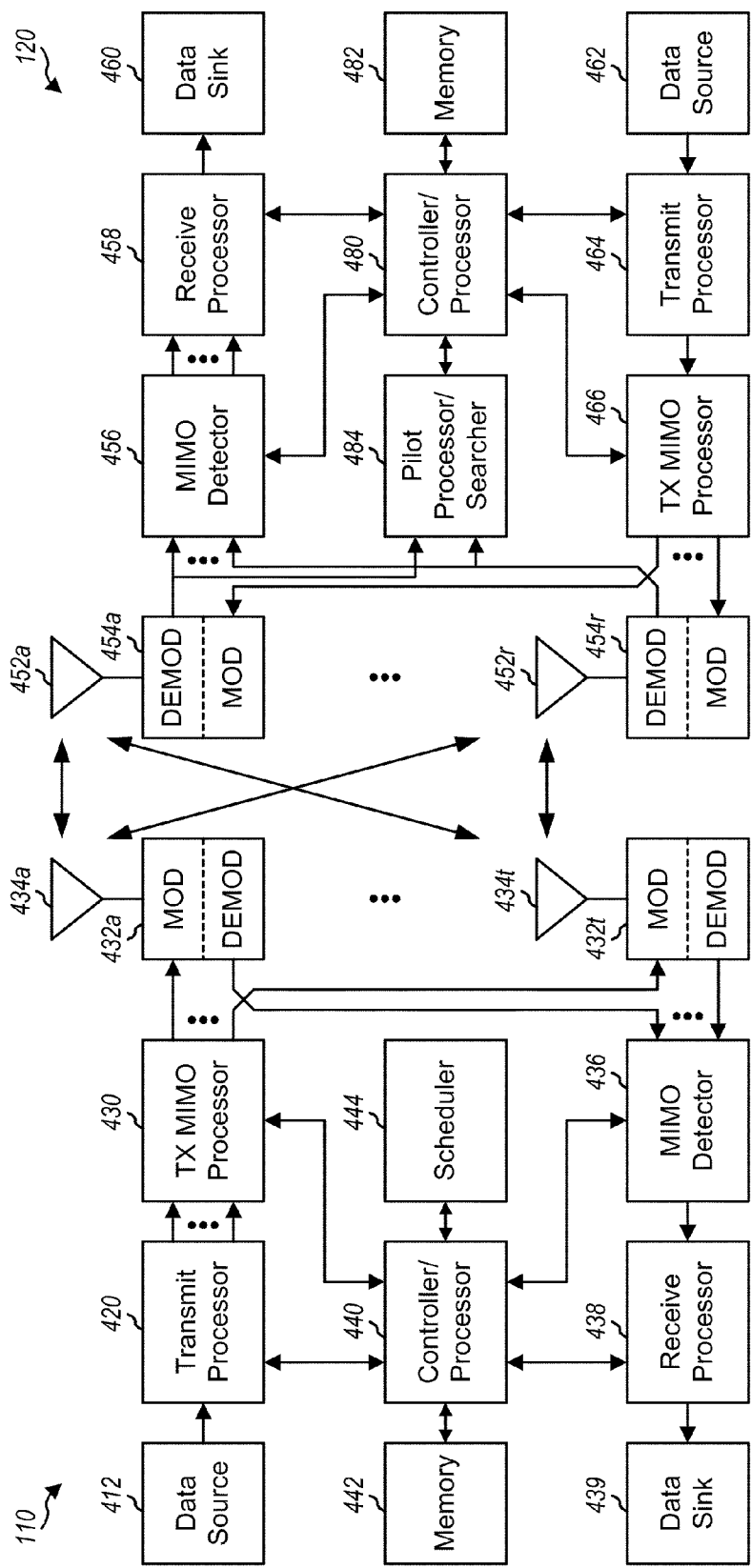
FIG. 4 shows a block diagram of a base station and a UE.

FIG. 4 shows a block diagram of a design of a base station 110 and a UE 120, which may be one of the base stations and one of the UEs in FIG. 1. Base station 110 may support one or more cells. Base station 110 may be equipped with T antennas 434a through 434t, and UE 120 may be equipped with R antennas 452a through 452r, where in general T≥1 and R≥1.

At base station 110, a transmit processor 420 may receive data for one or more UEs from a data source 412, process (e.g., encode, interleave, and symbol map) the data for each UE, and provide data symbols for all UEs. Transmit processor 420 may also process control information from a controller/processor 440 and provide control symbols. Transmit processor 420 may also generate pilot symbols for a common pilot, a low reuse pilot, and/or other pilots or reference signals for each cell supported by base station 110. A transmit (TX) multiple-input multiple-output (MIMO) processor 430 may perform precoding on the data symbols, the control symbols, and/or the pilot symbols, if applicable. Processor 430 may provide T output symbol streams to T modulators (MODs) 432a through 432t. Each modulator 432 may process a respective output symbol stream (e.g., for OFDM, CDMA, etc.) to obtain an output sample stream. Each modulator 432 may further process (e.g., convert to analog, amplify, filter, and upconvert) the output sample stream to obtain a downlink signal. T downlink signals from modulators 432a through 432t may be transmitted via T antennas 434a through 434t, respectively.

At UE 120, antennas 452a through 452r may receive the downlink signals from base station 110 and other base stations and may provide received signals to demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, CDMA, etc.) to obtain received symbols. A MIMO detector 456 may obtain received symbols from all R demodulators 454a through 454r, perform receiver spatial processing on the received symbols if applicable, and provide detected symbols. A receive processor 458 may process (e.g., demodulate, deinterleave, and decode) the detected symbols, provide decoded data for UE 120 to a data sink 460, and provide decoded control information to a controller/processor 480. A pilot processor/searcher 484 may receive input samples from all demodulators 454 and may detect for pilots from cells, as described below.

the uplink, at UE 120, a transmit processor 464 may receive and process data from a data source 462 and control information (e.g., for detected cells, time measurements, etc.) from controller/processor 480. Transmit processor 464 may also generate pilot symbols. The symbols from transmit processor 464 may be precoded by a TX MIMO processor 466 if applicable, further processed by modulators 454a through 454r, and transmitted to base station 110. At base station 110, the uplink signals from UE 120 and other UEs may be received by antennas 434, processed by demodulators 432, detected by a MIMO detector 436 if applicable, and further processed by a receive processor 438 to obtain decoded data and control information transmitted by the UEs.

Controllers/processors 440 and 480 may direct the operation at base station 110 and UE 120, respectively. Memories 442 and 482 may store data and program codes for base station 110 and UE 120, respectively. A scheduler 444 may schedule UEs for data transmission on the downlink and/or uplink and may provide resource grants for the scheduled UEs.

Figure 5:
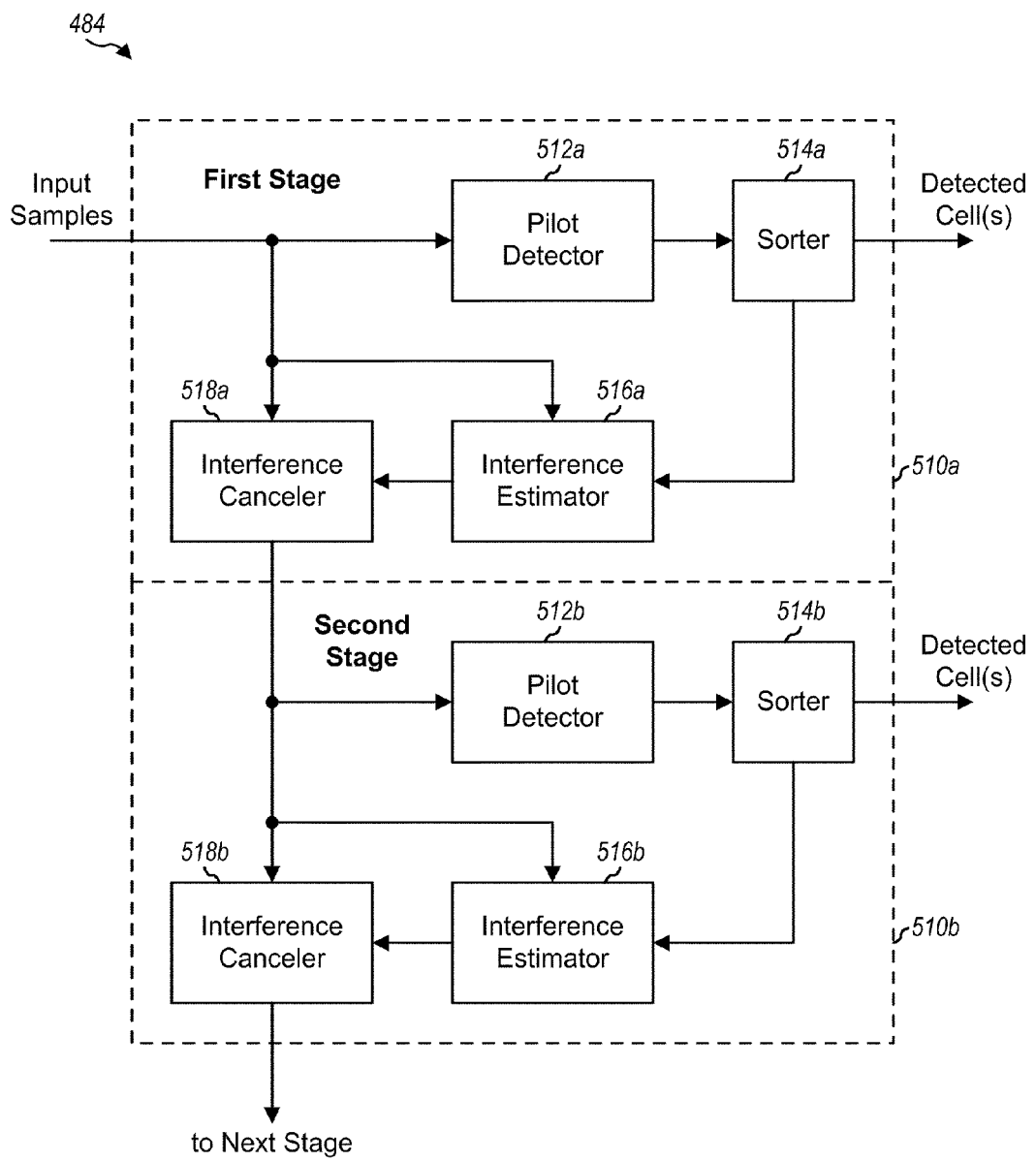
FIG. 5 shows a block diagram of a pilot processor/searcher.

FIG. 5 shows a block diagram of a design of pilot processor/searcher 484 at UE 120 in FIG. 4. In this design, pilot processor 484 may perform cell detection with SDC in multiple stages 510. For simplicity, only two stages 510a and 510b are shown in FIG. 5.

In the first stage 510a, a pilot detector 512a may receive the input samples from demodulators 454, detect for pilots (e.g., common pilots and/or low reuse pilots) transmitted by cells based on the input samples, and provide the strength and timing of each detected cell. Pilot detector 512a may detect for pilots in a manner that is dependent on how the pilots are generated and transmitted by the cells. In one design, pilot detector 512a may locally generate a sample sequence for a pilot from a cell to be detected, which is referred to as a pilot signal in the description above. The locally generated sample sequence may be for a PN sequence assigned to the cell in HRPD, an OFDM symbol comprising a PA-RS transmission in LTE, etc. Pilot detector 512a may correlate the input samples with the locally generated sample sequence at different time offsets to obtain correlation results for different time offsets for the cell. Pilot detector 512a may identify a sufficiently strong cell based on the correlation results, as described above. In one design, UE 120 may receive a set of cells (e.g., from a serving cell), and pilot detector 512a may detect for each cell in the set. In another design, pilot detector 512a may detect for each possible cell by cycling through all possible cell IDs, e.g., all 504 cell IDs in LTE. For all designs, pilot detector 512a may provide a list of detected cells, the SINR (or energy) and timing of each detected, and/or other information.

A sorter 514a may receive the search results from pilot detector 512a and may sort the SINRs of the detected cells. Sorter 514a may select one or more detected cells for interference cancellation and may provide the identity of each selected cell to an interference estimator 516a. Sorter 514a may select the strongest cell (or one or more cells based on one or more criteria) for interference cancellation.

Interference estimator 516a may receive the selected cell(s) from sorter 514a and the input samples and may estimate the interference due to the pilot from each selected cell. To estimate the interference due to a given selected cell, interference estimator 516a may derive a channel estimate for the selected cell based on the input samples (e.g., using the common pilot transmitted by the cell). Interference estimator 516a may locally generate the pilot from the selected cell in the same manner as the cell and may apply the locally generated pilot through the channel estimate to obtain an interference estimate. The accuracy of the interference estimate may be dependent on the accuracy of the channel estimate, which may be better for a strong cell and/or after canceling interference from a strong cell.

An interference canceller 518a may receive the input samples and the estimated interference for each selected cell from interference estimator 516a. Interference canceller 518a may subtract the estimated interference for each selected cell from the input samples and may provide interference-canceled samples to the second stage 510b.

Second stage 510b includes a pilot detector 512b, a sorter 514b, an interference estimator 516b, and an interference canceller 518b that may operate on the interference-canceled samples in similar manner as the corresponding units in the first stage 510a. Pilot detector 512b may detect for pilots (e.g., common pilots and/or low reuse pilots) from cells not detected or not canceled in the first stage 510a. Sorter 514b may select one or more detected cells for interference cancellation. Interference estimator 516b may estimate the interference due to each selected cell. Interference canceller 518b may cancel the estimated interference for each selected cell from the interference-canceled samples and may provide new interference-canceled samples to the next stage.

In general, pilot processor 484 may include any number of stages 510 and may operate in various manners. For SDC, pilot processor 484 may sort the SINRs (or energies) of all detected cells in each stage and may select the strongest detected cell for interference cancellation in that stage. Detection performance may improve by canceling the interference from the strongest cell in each stage and then processing the interference-canceled samples in the next stage. This may result in a more accurate estimate of the interference from the strongest cell detected in the next stage based on the interference-canceled samples having low interference from the strongest cell detected in each prior stage.

In another design, pilot processor 484 may perform interference cancellation for all detected cells in each stage. For each stage, pilot processor 484 may estimate the interference due to each detected cell in that stage, cancel the interference due to all detected cells, and provide interference-canceled samples to the next stage. In yet another design, pilot processor 484 may perform interference cancellation for a predetermined number of strongest detected cells in each stage. In yet another design, pilot processor 484 may perform interference cancellation for all detected cells with energies exceeding a threshold in each stage. The threshold may be a fixed value that can provide good performance. The threshold may also be a configurable value, which may be set to a particular percentage of the total received energy of the UE. Pilot processor 484 may also perform SDC in other manners.

Pilot processor 484 may perform cell detection with SDC in multiple stages, e.g., as shown in FIG. 5. Pilot processor 484 may provide search results for one or more detected cells in each stage and may also cancel the interference from one or more selected cells in each stage. Pilot processor 484 may repeat the SDC processing until a termination condition is encountered. This termination condition may occur when a target number of cells have been detected, when all cells in the set have been detected, when pilot processor 484 cannot detect any more cells, etc.

FIG. 6 shows a design of a process 600 for performing cell detection with SDC. Process 600 may be performed by a UE (as described below) or by some other entity. The UE may process a received signal to detect for a cell (block 612). The UE may process the received signal to detect for common pilots transmitted by cells with a reuse factor of one, for low reuse pilots transmitted by cells with a reuse factor greater than one, or for some other signals transmitted by the cells. The UE may determine whether the detected cell is sufficiently strong (block 614). The UE may cancel the interference due to the detected cell from the received signal to obtain an interference-canceled signal if the detected cell is sufficiently strong (block 616). The UE may process the interference-canceled signal to detect for another cell if the detected cell is sufficiently strong (block 618). The UE may skip the interference cancellation for the detected cell if it is not sufficiently strong.

In one design, the UE may detect for cells in a set of cells in a sequential order, from the strongest cell to the weakest cell. The set of cells may be a candidate set sent by a serving cell, a set of all possible cells, etc. For block 612, the UE may detect for the strongest cell in the set. For block 618, the UE may process the interference-canceled signal to detect for the second strongest cell in the set. The UE may determine whether the second strongest cell is sufficiently strong. The UE may cancel the interference due to the second strongest cell from the interference-canceled signal to obtain a second interference-canceled signal if the second strongest cell is sufficiently strong. The UE may then process the second interference-canceled signal to detect for the next strongest cell in the set. The UE may terminate detection when a cell not sufficiently strong is detected or when all cells in the set have been detected.

In one design of block 612, the UE may perform correlation on the received signal at different time offsets to identify channel taps for the cell. The UE may then detect for the cell based on the identified channel taps.

In one design of block 614, the UE may determine a metric for the detected cell. The metric may comprise an SINR of the cell, received energy of the cell, etc. The UE may compare the metric against a threshold and may declare the cell to be sufficiently strong if the metric exceeds the threshold. In one design, the UE may determine the metric for the cell based on only the strongest channel tap for the cell. In another design, the UE may determine the metric for the cell based on all sufficiently strong channel taps identified for the cell. The UE may determine whether a given channel tap is sufficiently strong based on a second metric (e.g., an SINR) for the channel tap and a second threshold. The UE may identify channel taps for the detected cell in a sequential order, from the strongest channel tap to the weakest channel tap, and may terminate processing for the detected cell when an identified channel tap is not sufficiently strong. The UE may perform interference cancellation (i) after each sufficiently strong channel tap is identified or (ii) after all channel taps are identified.

In one design of block 616, the UE may derive a channel estimate for the detected cell based on the received signal. The UE may generate a pilot signal for the detected cell and may estimate the interference due to the detected cell based on the pilot signal and the channel estimate for the detected cell. The UE may then cancel the estimated interference from the received signal.

In one design, the UE may obtain time measurements for multiple detected cells and may obtain a location estimate for itself based on the time measurements. In another design, the UE may identify multiple detected cells and may obtain a location estimate for itself based on the identities of the detected cells. For both designs, the location estimate may have improved accuracy due to a higher number of detected cells with SDC.

FIG. 7 shows a design of an apparatus 700 for performing cell detection. Apparatus 700 includes a module 712 to process a received signal to detect for a cell, a module 714 to determine whether the detected cell is sufficiently strong, a module 716 to cancel the interference due to the detected cell from the received signal to obtain an interference-canceled signal if the detected cell is sufficiently strong, and a module 718 to process the interference-canceled signal to detect for another cell if the detected cell is sufficiently strong.

The modules in FIG. 7 may comprise processors, electronics devices, hardware devices, electronics components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of interference cancellation in a wireless network, comprising:
   processing a received signal to detect one or more cells based on a detection criterion;
   determining whether each cell, from the one or more detected cells, in the received signal is sufficiently strong or not sufficiently strong based on a strength criterion different from the detection criterion;
   obtaining an interference-canceled signal, the obtaining including, for each cell from the one or more detected cells:
      canceling interference due to the cell from the received signal when the cell is sufficiently strong; and
      skipping interference cancellation due to the cell from the received signal when the cell is not sufficiently strong; and
      obtaining an estimate of a position of a user equipment (UE) based at least in part on the interference-canceled signal.

2. The method of claim 1, wherein processing the received signal comprises detecting a strongest cell from the one or more detected cells.

3. The method of claim 2, wherein the one or more cells are detected in a sequential order, from the strongest cell to a weakest cell, and wherein detecting terminates when a cell of the one or more detected cells is not sufficiently strong or when all cells of the one or more cells have been detected.

4. The method of claim 1, wherein processing the received signal comprises:
   performing correlation on the received signal at different time offsets to identify channel taps for the cell, and
   detecting the cell based on the identified channel taps.

5. The method of claim 1, wherein determining whether each cell, from the one or more cells, in the received signal is sufficiently strong comprises:
   determining a metric for the cell;
   comparing the metric against a threshold corresponding to the strength criterion; and
   determining that the cell is sufficiently strong when the metric exceeds the threshold.

6. The method of claim 5, wherein the metric comprises a signal-to-noise and-interference ratio (SINR) of the cell.

7. The method of claim 5, wherein the metric comprises a received energy of the cell.

8. The method of claim 5, wherein determining the metric for the cell comprises determining the metric for the cell based on a strongest channel tap for each cell.

9. The method of claim 5, wherein determining the metric for the cell comprises determining the metric for the cell based on all sufficiently strong channel taps identified for the cell.

10. The method of claim 9, wherein determining the metric for the cell further comprises determining whether a channel tap is sufficiently strong based on a second metric for the channel tap and a second threshold.

11. The method of claim 9, wherein channel taps for the cell are identified in a sequential order, from a strongest channel tap to a weakest channel tap,
and wherein processing for the cell terminates when an identified channel tap is not sufficiently strong.

12. The method of claim 11, further comprising:
performing interference cancellation after each sufficiently strong channel tap for the cell is identified.

13. The method of claim 1, wherein canceling interference due to the cell comprises:
deriving a channel estimate for the cell based on the received signal,
generating a pilot signal for the cell,
estimating interference due to the cell based on the pilot signal and the channel estimate for the cell, and
canceling the estimated interference from the received signal.

14. The method of claim 1, wherein the received signal is processed to detect common pilots transmitted by cells with a reuse factor of one.

15. The method of claim 1, wherein the received signal is processed to detect low reuse pilots transmitted by cells with a reuse factor greater than one.

16. The method of claim 1, further comprising:
obtaining time measurements for each cell in the received signal that is sufficiently strong; and wherein the estimate of the position of the UE is based at least in part on the time measurements for each cell in the received signal that is sufficiently strong.

17. The method of claim 1, further comprising:
identifying each cell in the received signal that is sufficiently strong;
wherein the estimate of the position of the UE is based at least in part on identities of each cell in the received signal that is sufficiently strong.

18. An apparatus for wireless communication, comprising:
means for processing a received signal to detect one or more cells based on a detection criterion;
means for determining whether each cell, from the one or more detected cells, in the received signal is sufficiently strong or not sufficiently strong based on a strength criterion different from the detection criterion; and
means for obtaining an interference-canceled signal, the obtaining including, for each cell from the one or more detected cells:
canceling interference due to the cell from the received signal, when the cell is sufficiently strong; and
skipping interference cancellation due to the cell from the received signal when the cell is not sufficiently strong; and
means for obtaining an estimate of a position of a user equipment (UE) based at least in part on the interference-canceled signal.

19. The apparatus of claim 18, wherein the means for processing the received signal comprises means for detecting a strongest cell from the one or more detected cells.

20. The apparatus of claim 19, wherein the one or more cells are detected in a sequential order, from the strongest cell to a weakest cell, and wherein detection terminates when a cell of the one or more detected cells is not sufficiently strong or when all cells of the one or more cells have been detected.

21. The apparatus of claim 18, wherein the means for determining whether each cell, from the one or more cells, in the received signal is sufficiently strong comprises:
means for determining a metric for the cell;
means for comparing the metric against a threshold corresponding to the strength criterion; and
means for determining that the cell is sufficiently strong when the metric exceeds the threshold.

22. The apparatus of claim 21, wherein the means for determining the metric for the cell comprises means for determining the metric for the cell based on all sufficiently strong channel taps identified for the cell.

23. An apparatus for wireless communication, comprising:
a memory unit; and
at least one processor coupled to the memory unit, wherein the at least one processor is configured:
to process a received signal to detect one or more cells based on a detection criterion,
to determine whether each cell, from the one or more detected cells, in the received signal is sufficiently strong or not sufficiently strong based on a strength criterion different from the detection criterion,
to obtain an interference-canceled signal, the obtaining including, for each cell from the one or more detected cells:
canceling interference due to the cell from the received signal, when the cell is sufficiently strong; and
skipping interference cancellation due to the cell from the received signal when the cell is not sufficiently strong; and
to obtain an estimate of a position of a user equipment (UE) based at least in part on the interference-canceled signal.

24. The apparatus of claim 23, wherein the at least one processor is further configured:
to process the received signal to detect a strongest cell from the one or more detected cells.

25. The apparatus of claim 24, wherein the at least one processor is further configured:
to detect one or more cells in a sequential order, from the strongest cell to a weakest cell, and
to terminate detection for the one or more cells when a cell of the one or more detected cells is not sufficiently strong or when all cells of the one or more cells have been detected.

26. The apparatus of claim 23, wherein the at least one processor determines whether each cell, from the one or more cells, in the received signal is sufficiently strong by being further configured:
to determine a metric for the cell,
to compare the metric against a threshold corresponding to the strength criterion, and
to determine that the cell is sufficiently strong when the metric exceeds the threshold.

27. The apparatus of claim 26, wherein the at least one processor is further configured to determine the metric for the cell based on all sufficiently strong channel taps identified for the cell.

28. A a non-transitory computer-readable storage medium, comprising program code for causing at least one processor to:
process a received signal to detect one or more cells based on a detection criterion, determine whether each cell, from the one or more detected cells, in the received signal is sufficiently strong or not sufficiently strong based on a strength criterion different from the detection criterion;

obtain an interference-canceled signal, including for each cell from the one or more detected cells:
- cancel interference due to the cell from the received signal, when the cell is sufficiently strong; and
- skip interference cancellation due to the cell from the received signal when the cell is not sufficiently strong; and obtain an estimate of a position of a user equipment (UE) based at least in part on the interference-canceled signal.

* * * * *